(12) United States Patent
Summers et al.

(10) Patent No.: US 11,757,972 B2
(45) Date of Patent: *Sep. 12, 2023

(54) WEB TRAFFIC ROUTING

(71) Applicant: Button, Inc., Grenwich, CT (US)

(72) Inventors: Sean Joey Summers, San Francisco, CA (US); Chritopher James Maddern, New York, NY (US); Keith Austin Johnson, Brooklyn, NY (US)

(73) Assignee: Button, Inc., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,193

(22) Filed: Oct. 19, 2022

(65) Prior Publication Data

US 2023/0164209 A1 May 25, 2023

Related U.S. Application Data

(63) Continuation of application No. 17/358,680, filed on Jun. 25, 2021, now Pat. No. 11,489,908.

(51) Int. Cl.
| | | |
|---|---|---|
| *H04L 67/02* | (2022.01) | |
| *H04L 45/42* | (2022.01) | |
| *H04L 67/306* | (2022.01) | |
| *H04L 67/63* | (2022.01) | |
| *H04L 29/08* | (2006.01) | |
| *H04L 12/717* | (2013.01) | |

(52) U.S. Cl.
CPC .............. *H04L 67/02* (2013.01); *H04L 45/42* (2013.01); *H04L 67/306* (2013.01); *H04L 67/63* (2022.05)

(58) Field of Classification Search
CPC ........ H04L 67/02; H04L 67/63; H04L 67/306; H04L 45/42

USPC .......................................................... 709/223
See application file for complete search history.

(56) References Cited

U.S. PATENT DOCUMENTS

| | | | |
|---|---|---|---|
| 7,970,891 B1* | 6/2011 | Kontothanssis et al. ................... | G06F 16/9566 709/224 |
| 8,849,812 B1 | 9/2014 | Mukherjee et al. | |
| 9,558,502 B2 | 1/2017 | Carlson et al. | |
| 9,712,890 B2 | 7/2017 | Shivadas et al. | |
| 9,742,661 B2 | 8/2017 | Klais | |
| 10,902,942 B1 | 1/2021 | Hames et al. | |
| 11,005,910 B1 | 5/2021 | He | |
| 2004/0015579 A1 | 1/2004 | Cooper et al. | |
| 2010/0161378 A1 | 6/2010 | Josifovski et al. | |
| 2012/0233329 A1 | 9/2012 | Dickinson et al. | |
| 2012/0278185 A1 | 11/2012 | Ramachandran et al. | |
| 2013/0178195 A1* | 7/2013 | Luna et al. ........ | H04L 67/306 455/414.1 |
| 2013/0311565 A1* | 11/2013 | Barry .................... | G06F 21/10 709/204 |

(Continued)

*Primary Examiner* — Wing F Chan
*Assistant Examiner* — Leon Y Tseng
(74) *Attorney, Agent, or Firm* — Lerner David LLP

(57) ABSTRACT

Aspects of the disclosure provide for methods, systems, and apparatuses, including computer storage media, for adaptively routing web traffic. A system can receive from a user computing device accessing a web resource, a content request, including data characterizing user interaction by the user computing device with the web resource before or after receiving the first content request. The system can identify a policy from a plurality of policies to execute in accordance with one or more objectives, wherein the plurality of policies are generated using data from a plurality of content requests and data characterizing user interaction with the web resource after serving a respective response to each of the plurality of content requests. The system can perform, in response to the content request, one or more actions of the ranked list of actions of the identified policy.

22 Claims, 6 Drawing Sheets

(56) References Cited

U.S. PATENT DOCUMENTS

| | | |
|---|---|---|
| 2015/0067819 A1 | 3/2015 | Shribman et al. |
| 2015/0106501 A1* | 4/2015 | Malets et al. ...... H04L 41/5019 709/224 |
| 2016/0119163 A1 | 4/2016 | Fadeev et al. |
| 2016/0134754 A1* | 5/2016 | Petrovykh ......... H04L 65/1096 379/266.01 |
| 2017/0366586 A1 | 12/2017 | Bloesch et al. |
| 2019/0163758 A1 | 5/2019 | Zhivotvorev et al. |
| 2019/0295127 A1* | 9/2019 | Napchi et al. ..... G06Q 30/0257 |
| 2020/0244605 A1* | 7/2020 | Nagaraja et al. ...... H04L 51/02 |
| 2021/0060404 A1* | 3/2021 | Wanke et al. .......... G06Q 50/01 |
| 2021/0152513 A1 | 5/2021 | Grayson et al. |
| 2021/0203641 A1 | 7/2021 | Mantin et al. |
| 2021/0336959 A1 | 10/2021 | Shah et al. |
| 2022/0329567 A1* | 10/2022 | Antoche-Albisor . G06F 21/577 |

* cited by examiner

WEB TRAFFIC ROUTING

CROSS-REFERENCE TO RELATED APPLICATION

This application is a continuation of U.S. Pat. Application No. 17/358,680, filed on Jun. 25, 2021, which issued as U.S. Pat. No. 11,489,908, the disclosures of which are hereby incorporated herein by reference.

BACKGROUND

Users may interact with a web page or resource through different applications, such as through a mobile browser, or an embedded browser of a separate mobile application. The application used by a particular user to access web pages or resources may be dependent on the operating system of the device, the applications installed on the device, or the device itself. The web page or resource can include content that a user can interact with through a user interface, such as by clicking on a link. A link can represent an element of the web page that when interacted with, causes the device of the user to send a content request.

SUMMARY

This disclosure provides for systems, methods, media, and devices for adaptively determining a policy by which content is provided to a computing device in response to a content request. The policy can be specific to characteristics of the computing device making the content request and/or the user operating the computing device, as examples. By leveraging diverse characteristics of many users and their respective devices requesting content, a feedback engine of a traffic routing system implemented according to aspects of this disclosure can specify how or what content is provided to different users in response to a content request.

The response to a content request can be determined based on analyzing patterns of content requests and responses from previous request-response interactions, and selecting a response for a current content request most like previous content requests with characteristics similar to those of the current request. When multiple responses are possible for a content request, a system as described herein can evaluate previous request-response interactions, and select a response according to one or more compared metrics between each of the previously evaluated request-response interactions.

In some cases, however, the content received according to a global set of rules in response to a content request may not be the response a particular user expects or wants. For example, a request may be submitted by a user via selection of a link. The response to the requests may be a prompt on a user device to install a mobile application. This response may not be the response of a user who selected the link from that same mobile application already installed on their device. Routing different types of content in response to requests from individual users accessing the same link is a technical challenge, especially given that the same web page including the link can be accessed by tens of thousands of different users in a given day. In addition, what is considered the response a user may expect or want can vary over time and according to different variables, such as characteristics of the user, characteristics of the user device, and characteristics of content providers and/or publishers of the requested content.

A user computing device can send a content request, for example in response to receiving user input interacting with a link. The feedback engine can process the content request and obtain data related to the content request. This data may include information related to the user device, the user, the publisher publishing the accessed web page or resource, and/or the content provider associated with the content requested. The feedback engine can process the obtained data and determine, according to one or more objectives, what content should be provided to the user device in response to the content request. In this way, the feedback engine can route content to the user device, according to the one or more objectives.

The feedback engine can process incoming content requests and provide content that most satisfies the one or more objectives. The objectives can be unique to the publisher publishing the web page or resource provided to the user computing device, and/or be unique and specified by the content provider for which content is content requested by the user device. The one or more objectives can include maximizing conversions by the user device, either to another web page or resource or to install a particular application. The objective(s) in addition or alternatively can include promoting user engagement with a particular type of content, or promoting certain types of user behavior, such as repeat purchasing.

One aspect of the disclosure provides for receiving, by one or more processors and from a user computing device accessing a web resource, a first content request, wherein the first content request includes data characterizing user interaction by the user computing device with the web resource before or after receiving the first content request; identifying, by the one or more processors, a policy from a plurality of policies including a ranked list of actions to perform in accordance with one or more objectives; and performing, by the one or more processors and in response to the content request, one or more actions of the ranked list of actions of the identified policy.

In one example, the plurality of policies are generated using data from a plurality of content requests received by the one or more processors and data characterizing user interaction with the web resource after serving a respective response to each of the plurality of content requests.

In some instances, receiving the content request includes receiving a data object including a plurality of data points, each data point corresponding to one or more of: a user of the user computing device, the user computing device, a publisher publishing the web resource accessed by the user computing device, interactions between the user computing device and a publisher computing device hosting the web resource, and content provided in response to the request.

In some instances, the plurality of content requests are a plurality of first content requests. The method can further include updating the plurality of policies, including receiving data corresponding to a plurality of second content requests previously received and processed by the one or more processors to generate a plurality of second responses; and generating, from the data corresponding to the plurality of second content requests, a mapping between input data points of the plurality of second content requests to one or more mapped policies.

In some instances, the generating includes evaluating metrics from data points representing user interaction between a respective computing device and the web resource for different actions performed as part of the second content requests; determining actions of policies with the highest evaluated metrics according to the one or more objectives; and mapping respective input data points to the policies including the determined actions.

In some instances, the one or more objectives include one or more of increasing user engagement, conversion rate, and repeat requests for the requested content. The evaluated metrics can include metrics quantifying, from the data characterizing user interaction at the computing device with the web resource before or after receiving the first content request, one or more of user engagement and conversion rate for the requested content.

In some instances, the ranked list of actions includes one or more of: prompting the user computing device to install a mobile application; redirecting the user computing device to a web resource hosting content in response to the content request; and sending a deep link to the web resource hosting content in response to the content request.

In some instances, performing the one or more actions includes: determining if a first ranked action ranked higher than a second ranked action of the ranked list can be performed to cause the user computing device to receive the content in response to the request; and performing the second ranked action only if the first ranked action cannot be performed.

In some instances, the user computing device is a first user computing device, the one or more actions are one or more first actions, and the content request is a first content request. The method further includes receiving, by the one or more processors, a second content request from a second user computing device different from the first user computing device for content that is the same as requested content in the first content request; determining whether to perform one or more second actions different from the one or more first actions, based at least on respective different device information specified in the first and second content requests for the first and second user computing devices, and in response to the determination, performing the one or more second actions in response to the second content request.

In some instances, the one or more second actions are from a policy different from the identified policy generated using the one or more objectives.

Other examples of the foregoing aspect can include a system including one or more processors, and one or more computer programs recorded on one or more computer-readable storage media.

Another aspect of the disclosure provides for A system including: one or more processors, and one or more memory devices storing instructions that when executed by the one or more processors, cause the one or more processors to perform operations including: receiving, from a user computing device accessing a web resource, a first content request, wherein the first content request includes data characterizing user interaction by the user computing device with the web resource before or after receiving the first content request; identifying, a policy from a plurality of policies including a ranked list of actions to perform in accordance with one or more objectives; and performing, in response to the content request, one or more actions of the ranked list of actions of the identified policy.

Another aspect of the disclosure provides for one or more non-transitory computer-readable storage media storing instructions that when executed by one or more processors causes the one or more processors to perform operations including: receiving, from a user computing device accessing a web resource, a first content request, wherein the first content request includes data characterizing user interaction by the user computing device with the web resource before or after receiving the first content request; identifying, a policy from a plurality of policies including a ranked list of actions to perform in accordance with one or more objectives; and performing, in response to the content request, one or more actions of the ranked list of actions of the identified policy.

BRIEF DESCRIPTION OF THE DRAWINGS

The foregoing aspects, features, and advantages of the present disclosure will be further appreciated when considered with reference to the following description of exemplary embodiments and accompanying drawings, wherein like reference numerals represent like elements. In describing the exemplary embodiments of the disclosure illustrated in the drawings, specific terminology may be used for the sake of clarity. However, the aspects of the disclosure are not intended to be limited to the specific terms used.

DETAILED DESCRIPTION

Overview

Figure 1:
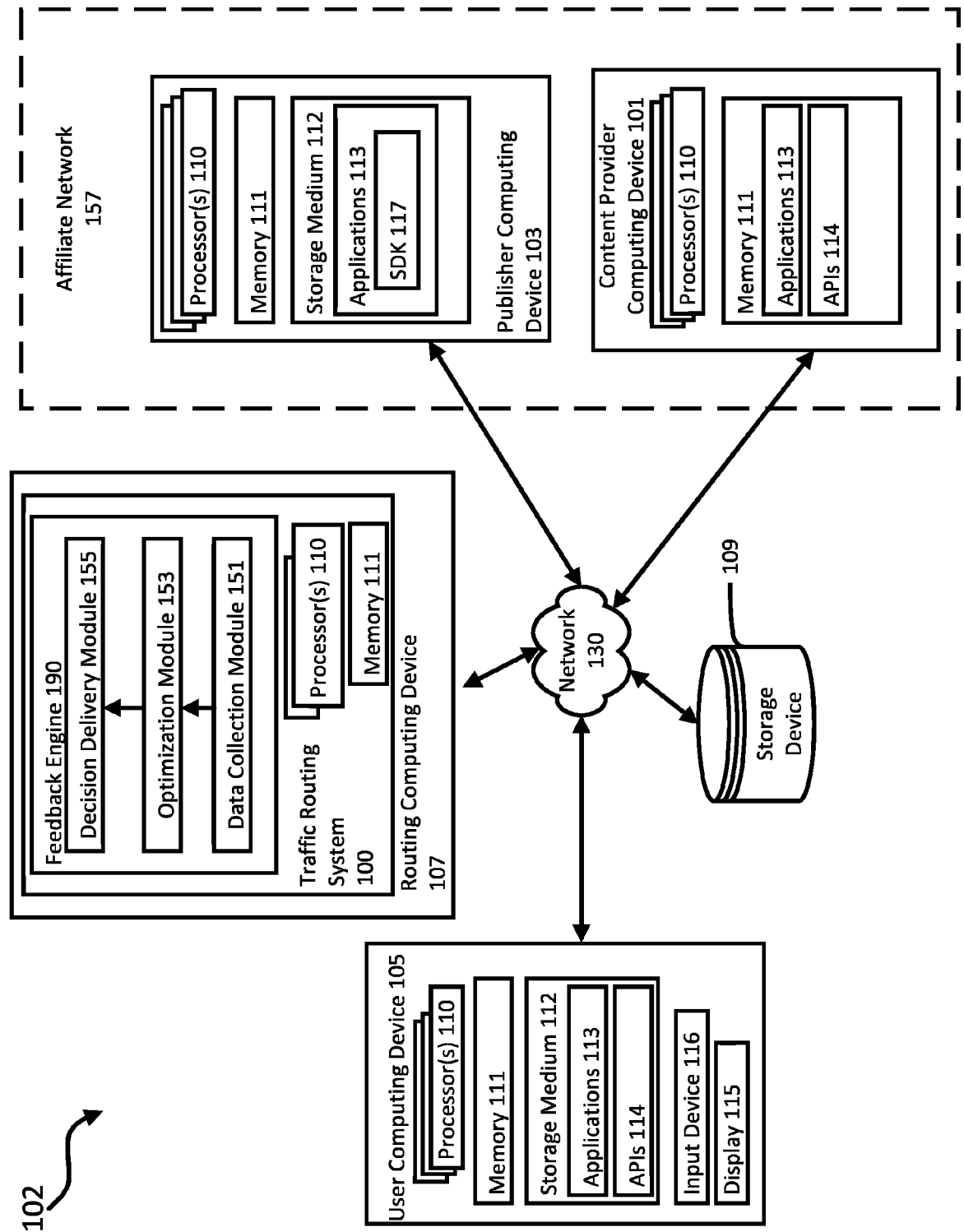
FIG. 1 is an example computing system in accordance with embodiments of the disclosure.

This technology relates to routing web traffic to a user computing device in response to a content request, such as from the user interacting with a link or URL displayed on the user computing device.

In general, a traffic routing system is configured to route content to user computing devices. The user computing devices can be configured to access content over a network, such as content published by a publisher, for example as part of a web page or resource. The content can be accessed by the user computing devices by web browsers or by one or more applications authored or otherwise provided by the publisher for accessing the published content. The applications used by the user computing devices to access content can vary, for example as an application built-in to an operating system running on the user computing devices, or as mobile applications if the user computing devices are mobile devices like a tablet or smartphone. A web resource can be any data accessible and identifiable over a network, such as a file, including video files, image files, audio files, and text files, or directories of files, such as a folder of files.

A request for content, referred to herein as a content request, can be made in response to user interaction on a user computing device. For example, the user computing device can register a click or touch screen press of a link or other interactable element on a web page or resource. In response to the user interaction a content request may be generated. In other examples, the content request can be automatic, for example as soon as the user computing device is navigated to a particular web page or resource.

The user computing device can be configured to send a content request to the traffic routing system. For example, the content request can be sent in response to one or more user interactions with the accessed web page or resource detected by the user computing device. As described herein, the content request can include a plurality of data points characterizing the interactions leading up to or coming after the content request. The content request itself can include information formatted according to any communication protocol for communicating over a network.

When a content request is made by a user computing device, the traffic routing system can process the content request and obtain information related to the content request. In some instances, subsequent interactions between the user computing device and a publisher computing device may be processed. The traffic routing system includes the feedback engine that is configured to receive the content request and information related to the content request, and to return a policy most suited for the content request according to one or more predetermined objectives. As described in detail herein, based on the returned policy, certain types of content can be presented through the user computing device, such as an advertisement or a promotion. The policy can also specify how the content is to be presented, for example through a mobile application installed on the user computing device, or a mobile web browser.

The additional information related to the content request can include information about the user computing device, the user, the publisher and/or the content provider, as described herein. This additional information can also be included as part of the plurality of data points characterizing the interactions leading up to or coming after the content request. For example, the information related to the content request can include user computing device information, such as device type, operating system, and operating system version, web browser and/or application information from which the content request was sent. In addition or alternatively, the information related to the content request can include location information for the device, the web pages or resources accessed by the user computing device leading up to the content request, or a destination URL specified by the element interacted with on the web page or resource that caused the user computing device to generate a content request.

The traffic routing system can also be configured to obtain the information at the time the content request is sent by the user computing device, as well as some time after the content request is sent. Information related to interactions made after content is received in response to a content request can also be collected and used to improve how subsequent content is routed, as described herein with reference to the optimization module of the feedback engine. Information collected after the content request is sent can include subsequent user interaction with a web page or resource. For example, the traffic routing system can obtain data characterizing purchases made or other web pages or resources visited after the content request is made and after content responsive to the content request is sent back to the user computing device. In addition to purchases, other interactions represented can include link clicks, redirects, such as to an application marketplace for downloading an application, application installations, views of different web pages or resources (such as of different products), and adding or removing items from an online shopping cart of a web page or resource.

The feedback engine of the traffic routing system can be configured to use this additional data to generate a map between content requests associated with data having certain characteristics and policies that result in content sent in response to the content requests that most satisfies predetermined objectives. In this way, the user experience of a user operating the content requesting computing device can be improved by receiving content that is determined by the feedback engine to be the content that most satisfies the objectives.

The policy can be a set of rules and/or parameters characterizing the type of content to provide in response to the content request, which is adaptive and specific to the user computing device and/or other characteristics of the user, a particular publisher, and/or a particular content provider. The policy can specify a routing preference, for example a preference from which sources to obtain content for the user computing device in response to the content request. The policy can also specify specific types of content.

In addition or alternatively, the policy can define additional metadata that is provided to the user computing device that can change how content is displayed or otherwise presented on a display of the user computing device. This additional metadata can be used to alter the presentation of content responsive to a content request, as well as to modify the experience of a user using a browser or other application to access and request content.

For example, the policy can specify that certain cookies or HTTP headers be sent in addition to the requested content, for affecting behavior of the application, such as a web browser used to view the content on the user computing device.

Once the feedback engine generates a policy for routing content to the user computing device in response to a content request, the traffic routing system can route to the user computing device content specified by the policy from one or more content service computing devices. As described herein, the content provider computing devices can be servers or other devices that store content to be provided to the user computing devices.

A publisher can be any entity or entities, such as a person, group of people, business or legal entity, or software configured to automatically post content. The content itself can be a web site with one or more web pages or resources. The content can be subdivided on a web page presented on a user computing device, with different subdivisions corresponding to content originating from different content providers in communication with the publisher.

A publisher can maintain one or more publisher computing devices, described herein, that are configured to serve content to user computing devices, and can also be configured to host the necessary software to view certain types of content on the user computing device, if necessary.

The content published by the publisher computing devices can be any form of content that can be communicated across devices coupled to a network. For example, the content can be multimedia content, such as videos, images, gifs, or live streams. In addition or alternatively, the content can include information about products or services for sale, including products or services of different brands, as well as information about where to purchase the products or services. As examples, the content can be content on another hosted web page. The content can be media, including text, images, and/or video. The content can also include prompts to install applications on the user computing device. The content can be an application marketplace or other source to download a particular application, for example an application associated with a particular brand corresponding to the link published by a publisher.

A content provider can be one or more entities, such as a person, group of people, business or legal entity, or automated software. For example, the content provider can maintain a particular brand of product or service, and generate content related to that brand, such as advertisements, sale promotions, or general information about the product or service.

The content service computing device(s) can form at least part of an affiliate network, and be configured to communicate with publisher computing devices obtaining content that can be later displayed on user computing devices accessing a page or resource. A publisher computing device can be subscribed to or otherwise associated with the affiliate network and receive content for publishing, for example as an advertisement to publish on a blog.

As an example of how the traffic routing system can cause different content to be sent to a user computing device in response to a content request, consider user computing device A and user computing device B. In this example, user computing device A is a mobile device running a mobile application published by publisher A and displaying an embedded web page, while user computing device B is running a native mobile browser to display a mobile webpage published by publisher B. On the web page is a link indicating that the link is related to a promotion for a hotel coupon code. Both device A and device B can receive respective interactions with the link, for example through touch input. Both devices in turn generate a content request, in this example for the hotel coupon code. In some implementations, the content request is made automatically, for example upon device A and device B accessing the web page.

When device A sends the content request, the traffic routing system can process the content request and additional information through the feedback engine. Part of the additional information can include information relating to the fact that the content request was generated on a publisher mobile application. In response, the feedback engine can generate a policy for providing the hotel coupon code to device A. The traffic routing system can route content related to the hotel coupon code to device A.

When device B sends the content request and additional information indicating that the content request was not generated within the publisher mobile application, the traffic routing system, similar to the case of device A, can process the content request and additional information. In this case, however, the feedback engine can generate a policy that specifies that device B, in addition to the content requested coupon code, receives a prompt to install a mobile application associated with a content provider providing the hotel coupon code.

The difference in content sent between device A and device B can be indicative of one or more objectives the feedback engine used as part of generating a map between input data including a content request and additional data, and output policies that specify content to be sent in response to the content request in accordance with the objective(s). For example, the objectives used by the feedback engine may relate to coupon usage, for example an objective may be presenting a coupon in response to a content request such that the likelihood that the coupon is applied is maximized. As described in more detail herein, the feedback engine can learn that a coupon sent to a mobile application is more likely to be redeemed than a coupon sent to a mobile web browser.

In response, the feedback engine can learn a particular policy that specifies sending a prompt to install the mobile application, in addition to the content requested coupon code, to a mobile device sending a content request from a mobile web browser. On the other hand, a prompt to install a mobile application is likely not beneficial to the user of device A, as device A already has the mobile application installed. Thus, the prompt to install the mobile application may detract from the user experience and decrease the likelihood that the content requested coupon code is used. Therefore, the feedback engine generates a different policy in response to the content request from device A that does not specify sending a prompt to install a mobile application.

The foregoing example illustrates how the feedback engine can adapt content request responses under certain conditions. As described herein, the feedback engine can be configured to learn complex maps between a variety of different inputs and corresponding policies that cannot be handpicked to the same level of granularity. Further, global policies or policies applied using a limited set of heuristics or handpicked rules can become stale very quickly, and cannot be quickly adapted in response to changes in the environment in which content is requested and received, including changes in user behavior, the means by which users access content, or the variability of the different types of content available on the internet or other large network.

Example Systems

FIG. 1 shows an example distributed computing system 102 that includes a traffic routing system 100 in which the features described herein may be implemented. In this example, the distributed computing system 102 includes the traffic routing system 100, content provider computing device 101, publisher computing device 103, and user computing device 105, which may be collectively referred to as computing devices. The distributed computing system 102 may also include a storage device 109.

Communication between the computing devices 101-107, as well as between the computing devices 101-105 and the traffic routing system 100 implemented on the routing computing device 107, may be performed through network 130, as described herein. The computing devices 101-107 can also communicate with the storage device 109 through the network 130. FIG. 1 should not be considered as limiting the scope of the disclosure or usefulness of the features described herein. In this regard, the features described herein may be implemented with many types of general or special purpose computing devices, such as personal computers, laptops, tablets, mobile phones, virtual computers, etc. Further, the features described herein may be implemented using many different combinations of devices.

The publisher computing device and the content provider computing device 101 can be part of a larger affiliate network 157. The affiliate network 157 can connect content providers with publishers for providing content to users accessing web pages or other resources published by the publishers. The affiliate network can connect multiple content providers with publishers through respective computing devices. The affiliate network 157 can also be configured to receive, for example through one or more devices, content requests received from the user computing device 105. As described herein, the affiliate network 157 can form the content request and include data points for processing by the feedback engine 190. The affiliate network 157 can then forward the content request with the additional information to the traffic routing system 100.

The traffic routing system 100 can be implemented on the routing computing device 107, and/or on a plurality of computing devices across one or more physical locations, including the routing computing device 107. The traffic routing system 100 can be part of a larger system for analyzing interactions between users and publishers, particularly interaction pertaining to content provided by one or more content providers. In some implementations, the traffic routing system 100 is a standalone system configured according to aspects described herein. In some implementations, the traffic routing system 100 is implemented on multiple devices, including the routing computing device 107.

The traffic routing system 100 can include a feedback engine 190. The feedback engine 190 can include a data collection module 151, an optimization module 153, and a decision delivery module 155.

In general, the data collection module 151 is configured to receive data corresponding to the user computing device 105 and a content request by the user computing device 105.

The data collection module 151 is configured for receiving data corresponding to a content request from a user computing device, as well as additional information about recorded interactions collected during or after the content request is received. The data can be represented as multiple data points, which can be categorized at least into three groups: user environment, user experience, and user journey.

Data points that fall under user environment can generally refer to characteristics for the devices and applications from which a content request is generated. Example data collected by the data collection module 151 here can include user computing device information, web browser and/or application information from the web browser or application used by the user computing device to display a web page or resource published by a publisher, location information of the user computing device, and information about the web page or resource itself.

Device information can include the type of user computing device, such as desktop, laptop, mobile device or wearable device. Device information can also include the type of hardware installed on the device, or hardware commonly associated with the device, such as the type of processor on a particular brand of smartphone. Device information can also include the type of operating system and software running on the device, including a respective version number for the operating system and software. The software information can include a type of web browser used, such as a web browser built into the operating system or a web browser commercially or freely available by other providers. Within the web browser, the device information may include information about different add-ons, plug-ins, or extensions installed and running on the web browser.

The device information can also include a unique identifier assigned to a respective user computing device, for example by a device manufacturer when the user computing device is built, such as a MAC address or an advertiser identifier. The unique identifier can also be associated per-device by software running on the device, for example the operating system or an application maintained by a publisher or content provider. The feedback engine 190 can track content requests by identifier, and aggregate information for the content requests as well as additional information. In some implementations, the feedback engine 190 can generate and associate a user computing device with a unique identifier.

The traffic routing system can also associate other devices by unique identifiers, such as publisher computing devices and content provider computing devices of the affiliate network 157. Different users can be categorized by the data collection module 151, for example according to shared characteristics, such as similar devices used to access web pages or resources.

The device information can include information about the type of application used to access a web page or resource, even if the application is not a web browser. For example, the device information can indicate that the user computing device accessed and displayed a web page or resource as information embedded on an application specially configured for accessing web pages or resources hosted by the publisher. In some cases, the application may obtain the web page or resource as information called from an application programming interface (API) exposing content to be published by the publisher. The exposed content may be stored on a publisher computing device or a content provider computing device of the affiliate network 157, as examples.

Data points that fall under user experience can generally refer to characteristics to how content is served to the user computing device 105 after a content request is made. Examples include the routing experience itself, such as whether content is provided through an application deep linked to the user computing device 105, content provided through a link to a web page or resource, and content provided through an application after prompting or requiring the user computing device 105 to install the application to view the content.

Data points falling under user experience can also include dynamic design elements, for example representing variations to how the same content is presented to the user computing device 105. As an example, a dynamic design element can include a dynamic landing page for content served as part of a request. For some requests, the landing page can appear different than for other requests. As another example, interstitial pages, such as web pages that are presented before or after content is served in response to a request, can vary, depending on publisher.

Interstitial pages presented in response to content can also vary, for example, based on a percentage chance of occurrence, with some pages predetermined to occur more often than other pages. Data points based on randomly occurring interstitial pages can also be used to characterize the effect on user experience, for example for comparing how users behave in response to receiving a less commonly occurring interstitial page versus a more commonly occurring page.

Data points that fall under user journey generally refer to characteristics defining interactions between the user and a user computing device. The data under this category can generally categorize decisions made by the user as represented by interactions recorded after a content request is made. Examples include link clicks, redirects, product views, products added for purchase, purchased products, and application installs.

The information collected by the data collection module 151 can include location information or information related to the time at which a content request was sent by the user computing device. For example, the location information can include a geographic region or zone where the user computing device was located at the time of the content request. The information can also include a timestamp for when the content request was made by the user computing device, and the timestamp can represent the time local to the user computing device and/or a standardized time used consistently throughout processing by the feedback engine 190. The timestamp can represent time according to different levels of granularities, for example by week, day, hour, minute, or second.

The information collected by the data collection module 151 can also include information collected that is associated with the publisher of the web page or resource accessed by the user computing device. This information can include a network address, hostname, or some identifier for the publisher and one or more publisher computing devices maintained by the publisher, either directly or indirectly.

The information collected by the data collection module 151 can also include information related to the element on the web page or resource interacted with to cause the user computing device to generate a content request. For example, the element can be a link. The link can specify a destination, for example as a URL to a product web page. In that case, the requested content can be specific to the product web page indicated by the link. In some cases, the link is a deep link, such as a link to a product in an application native to the content provider for the product, where the application is installed on the user computing device.

In some implementations, the link initially interacted with on the web page or resource may not be a deep link, but functionally acts as a deep link in serving content according to a policy generated by the feedback engine to route the requested content as content displayed on the native application installed on the user computing device. On the other hand, had the link been configured as a deep link for every accessing mobile device, the link could be broken at least for devices that do not have the native application installed that corresponds to the content or are otherwise unable to process the request for such a deep link.

The information collected by the data collection module 151 can also include parameter values corresponding to the content request. For example, a published link can include query parameter values appended to a link. The parameter values can incorporate additional information that the data collection module 151 can parse, such as location or time information described herein.

The data collection module 151 can collect and store data points for each interaction by different user computing devices on web pages or resources published by various publishers. The data collection module 151 can parse, process, and send the data to the optimization module 153 that in turn can process the data to learn different policies for serving content and modifying how the content is presented on a user computing device. Before passing the data, the data collection module 151 can format the data according to a predetermined format accepted by the optimization module 153. For example, the data collection module 151 can generate a vector or array of multiple dimensions, in which each element represents one or more data points. In some implementations, the data collection module 151 can fill in placeholder values for missing data points, which the optimization module 153 can parse out during processing described herein.

The data collection module 151 can receive the data described herein in a variety of different ways. As an example, the traffic routing system 100 can define an Application Programming Interface (API) specifying how content requests are sent from a computing device receiving a content request before redirecting it to the system 100. The API can define a data object with different fields, each corresponding to a different data point related to the content request. For example, the object can include information related to the link that was accessed as part of generating the content request, including query parameters, if applicable, pathname, and/or hostname. Additional parameters specified in the object sent to the system 100 can include HTTP request headers and related fields, such as cookies, user-agent, IP address, as well other information, such as timestamps during which the request is being processed.

The data collection module 151 can also collect data from computing devices implementing a software development kit (SDK) corresponding to the traffic routing system 100. In general, the SDK can be configured to allow applications to be built on a communicating computing device that includes communicating content requests and receiving responses from the traffic routing system 100. The SDK can implement an API that can define an object with different fields for communicating information about the content request, as described herein.

In some examples, the data collection module 151 can be configured to receive content requests including data points that can be processed further by the data collection module. For example, some data points can be identifiers mapped to a table or data structure stored and managed by the traffic routing system 100. The identifiers can be specific to a particular publisher. For example, a request can be sent as an object with a field containing a publisher identifier. The data collection module 151 can process the publisher identifier and retrieve corresponding information according to the publisher identifier. In one example, the publisher identifier can map to a category of traffic of multiple different categories associated with the publisher. The data collection module 151 can retrieve information related to that category, which can then be used as one or more data points for subsequent processing, as described here.

The optimization module 153 is configured to receive data collected by the data collection module 151, and to output one or more policies specifying how content should be routed in response to a content request from the user computing device 105. In general, the optimization module 153 is configured to generate a map, which maps input data from the optimization module 153 obtained in response to a content request by the user computing device 105, to one or more policies specifying how content should be routed and/or presented to the user computing device 105.

The mapping can be deterministic or stochastic. For example, an input set of data points corresponding to a content request can map to multiple different policies. The feedback engine 190 can be configured to sample from the set of different policies, according to a learned or predetermined sampling strategy. For example, the feedback engine 190 can sample randomly between the multiple different policies. As a result, how content is delivered and presented in response to a content request can sometimes vary, even for multiple interactions and corresponding content requests mapped to the same set of policies. The variation may be desired and specified, for example by a content provider to the traffic routing system 100 to occasionally provide for a unique user experience, such as through the inclusion of random creative content like videos or other animations. As another example, the variation may correspond to providing special offers and promotions for different products and services, such as to a random subset of user computing devices.

As another example, the sampling strategy can be learned by the optimization module 153, as described herein. The optimization module can learn the sampling strategy to maximize one or more objectives. For example, if the content requested is of a product, by introducing variety in how content is delivered and presented according to different policies, the feedback engine 190 can improve the likelihood that the product is subsequently purchased, for example because the variety of different experiences in delivering and presenting the content increases the appeal of the product overall.

The policy can specify a ranked order or list of actions to take in response to a content request. The set of possible actions can be predetermined, and the policy output by the optimization module 153 can order the set of possible actions, from which the decision delivery module 155, as described herein, can cause the actions to be performed according to the order.

The set of possible actions in general can relate to actions for how content is selected, presented, and delivered to the user computing device 105 in response to the content request. For example, the set of possible actions can include:
1. Sending a deep link to the user computing device 105 to an application installed on the device 105 for presenting the requested content.
2. Redirecting the user computing device 105 to a web page or resource different from the web page or resource from which the user computing device sent the content request.
3. Causing the user computing device 105 to generate a prompt to offer to install an application, for example an application associated with a publisher or content provider. In some examples, the prompt can be accompanied with the requested content.
4. Causing the user computing device 105 to install an application to view the content. Different from (3), above, this action can require that content responsive to the content request not be sent unless displayed through a particular application associated with a publisher or content provider.
5. Not performing any action, including the actions (1)-(4). Instead, the content request may be allowed to timeout. In some implementations, a "no action" includes an action to send the user computing device 105 some indication that the content request was not successful. Generally, a "no action" is avoided, and instead a policy will prioritize any other response before timeout or no response at all.

An example output policy of the routing optimization module 153 can be to rank the actions, such as those described above. For example, one potential ranking in a policy is shown in TABLE 1, below.

TABLE 1

| 1 | Deep link user computing device to installed application. |
| 2 | Offer user computing device application installation. |
| 3 | Send user computing device to web page or resource. |
| 4 | Perform actions for default web experience. |
| 5 | Force application installation on user computing device. |

In the example shown in TABLE 1, an output policy can rank some actions ahead of other actions, according to one or more objectives. For example, the optimization module 153 can generate a map that maps inputs to output actions predicted to benefit a publisher of the web page or resource from which a content request was generated by the user computing device 105. A "benefit" to the publisher can be measured according to different metrics and objectives corresponding to that publisher. One such metric can be how often a user computing device is navigated to the content sent in response to a content request, versus leaving the web page or resource altogether and navigating to a different page.

As another example, the optimization module 153 can predict that for certain types of content requests, the user computing device is more likely to engage with the requested content if the user computing device is deep linked to an application installed corresponding to the publisher. The requested content can then be presented on the installed application. However, absent an installed application, the policy in TABLE 1 specifies that the next ranked action is to offer to install the application on the device. If the offer is declined, then the next best action is to provide the requested content by redirecting the user computing device 105 to a web page or resource that includes the requested content.

In this example, the optimization module 153 has predicted a ranking of actions that is most likely to result in engagement with the requested content, and therefore meet the objective of being most "beneficial" to a publisher under this engagement metric. In other examples, the policy generated by the optimization module 153 can change, for example for different publishers, even if the objective and the metric(s) used are the same. In some cases, the policy generated can differ for the same publisher at different times.

As another example, TABLE 2, below, shows a different ranking in a policy output for a content request generated from a web page or resource published by a different publisher.

TABLE 2

| 1 | Deep link user computing device to installed application. |
| 2 | Force application installation on user computing device. |
| 3 | Send user computing device to web page or resource. |
| 4 | Perform actions for default web experience |
| 5 | Offer user computing device application installation. |

Comparing TABLE 1 and TABLE 2, the actions "force application installation on user computing device" and "offer user computing application installation" are swapped. TABLE 2 is an example of how a policy can change between publishers, or in some cases, change for the same publisher at different points in time.

Routing preferences and more generally policies corresponding to objectives for different publishers can vary over time. As a result, the feedback engine 190 can be configured to periodically update mappings between data points of content request and different policies. The period at which the feedback engine 190 performs these updates can, in some implementations, be random within a predetermined interval of time, e.g. weekly or daily at different points within that interval.

For example, the feedback engine 190 at one point can determine that the best policy for content requests from user computing devices accessing a web resource hosted by Publisher A is policy A. More specifically and for purposes of illustration, the feedback engine 190 can determine that web routing only (e.g., no prompts or links to install a mobile application) was generally better than other types of actions, such as prompting or linking user computing devices to install a mobile application for Publisher A. This determination can be based on objectives, for example user engagement, particular to Publisher A. In other words, the feedback engine 190 determines that user engagement is generally higher when web routing preferred policies are implemented over other policies.

Of note in this example is that Publisher A does not specify this preference to the feedback engine 190. Publisher A and its corresponding publisher computing device does not interact with the traffic routing system 100 to generate and update policies once the objectives for the publisher have been established. Rather, the feedback engine 190 processes content requests, including content requests originating from user computing devices accessing web pages or resources published by Publisher A, and evaluates different metrics corresponding to the different objectives particular to the Publisher A. For example, if the objective is user engagement, then one of the metrics evaluated can be the frequency at which the user computing device received user interactions for content received in response to a content request.

At a later time, Publisher A may decide to change how it presents its web resource to user computing devices accessing the web resource. As a result of these changes, the feedback engine 190—which is continuing to receive data for content requests as described herein--can determine that user engagement for content requests responded to under Policy A has decreased over time. The feedback engine 190 can process incoming content request data and update the mapping to reflect actions of a policy that are more likely to perform better under the objectives for Publisher A. The feedback engine 190 can determine, for example, that a new Policy B prioritizing prompting or linking user computing devices to install a publisher-related mobile application is preferable to the old web routing Policy A, at least as a result of changes made by Publisher A to its web page or resource.

Although the examples in the description of TABLE 1 and 2, herein, referred to a ranked list of actions to be performed, in some implementations a policy can specify multiple actions that can be performed as part of responding to a content request. Some actions can be defined by a policy to be performed at the exclusion of others, such as always prompting a user computing device to install an application instead of forcing the installation.

Different policies that can be applied in response to a content request can also be generated and executed with different probabilities. For example, between three policies A, B, and C, policy A may be executed for 90% of content requests, while policies B and C may be executed with 5% probabilities, respectively. One reason for generating multiple policies with different rates of occurrence is to introduce new data points for measuring user interaction and experience, based on how user interaction changes in response to different policies.

For example, a policy may occur less frequently but respond to a request with promotional content intended to be accessed by only a subset of requesting user devices. As another example, different policies may correspond to presenting different dynamic design elements in conjunction with requested content, such as different variations for how content is presented on-screen to a requesting device. One example of a dynamic design element is an interstitial page. An interstitial page can be presented, for example, before or after responding to a content request with a link or redirect to the requested content. Varying the rate of execution of different policies can be used to collect additional information about the user's interaction/experience following the presentation of these different interstitial pages, which can be used by the system to generate new policies as described herein.

To generate a map between inputs and policies, the optimization module 153 is configured to process a large amount of information, for example tens or hundreds of thousands of data points, and perform at least two tasks: outcome space sampling and optimizing mapped policies according to one or more objectives, per content request. To perform these tasks, the optimization module 153 can implement any of a variety of different statistical data processing techniques, including techniques using machine learning algorithms.

Outcome space sampling refers to determining with what probabilities to sample from different policies and/or actions within policies to perform in response to the content request.

As described herein, the one or more objectives can vary depending on the nature of the content request, for example depending on the publisher of the web page or resource accessed by the user computing device, or the content provider for the content requested by the user computing device. Examples of objectives include different types of conversions resulting from content received by the user computing device. The different types of conversions can include overall conversion rate, measured by a plurality of different conversion metrics, such as the number of web page conversions or application conversions. Web page conversions and application conversions can also be separate objectives, for example measured by a number of clicks to a particular web page or a number of installations on an application store, respectively.

The objectives can also include threshold parameter values corresponding to different recorded conversions. For example, an objective can be to maximize a likelihood that a user will purchase goods of a certain type, such as electronics. As another example, an objective can be to maximize one or more measurable characteristics of recorded interactions corresponding to a content request content, such as to maximize a number of clicks or redirects. The objectives can include a minimum user engagement, measured overall or according to separate metrics, which themselves can be individual objectives. Examples here include a minimum number of pages viewed, a number of deep links accesses, or a number of items added to an online shopping cart of a web page or resource accessed by the user computing device.

The objectives can also include objectives related to time between certain interactions by a user of a user computing device with a web page or resource. For example, one objective can be to minimize the time between a first interaction and a last interaction that results in the purchase of a good or service between the user computing device and the web page or resource. As other examples, one or more objectives can be related to maximizing the duration a web page, resource, or specific item of content is viewed.

As part of determining the mapping, the optimization module is configured to learn patterns between data points for processed content requests and actions performed in response to those content requests and that correspond to high-valued metrics when evaluated according to objectives of a given publisher. For example, the optimization module can be configured to learn certain patterns of data points processed before and after a response is provided in response to a content request, and associate those patterns of data points with a high user engagement when the actions performed as part of the response are performed. Referring back to the example herein between a web-routing Policy A and a prompting or linking Policy B, the optimization module can identify patterns of data points within content requests that perform best under Policy A versus B, according to one or more objectives.

The optimization module can also determine different rates to sample policies to maximize analyzed metrics against one or more objectives. For example, the optimization module can determine that performing actions in response to policy A with a particular probability can result in user interactions following receiving content in response to a request having better metrics with regard to one or more objectives, as opposed to always executing policy A at the exclusion of other policies.

Once receiving the input content request data and defining the objectives, the mapping can be generated according to any one of a variety of different techniques. Example techniques for processing the input data include a multi-armed bandit, Markov chain Monte Carlo, and Simulated Annealing. More than one technique can be applied together, for example random grid sampling or sparse grid sampling plus supervised learning techniques such as linear regression or neural networks.

For example, the optimization module can be implemented as one or more neural networks that can be trained to map data points of a content request to one or more policies. As training data, the optimization module can receive multiple content requests labeled according to policies that are determined to be the best policies to map to data points of the content requests, according to one or more objectives. Then, the optimization module can be trained according to any supervised learning technique, such as backpropagation with gradient descent, to learn weights and/or other model parameter values that cause the optimization module to output policies most like the ground-truth labels. A different or same neural network can be used to also identify probabilities from which to sample different policies, in examples in which the optimization module outputs more than one policy.

Once a policy has been identified, the traffic routing system 100 can perform one or more actions in accordance with the identified policy using the decision delivery module 155. The decision delivery module 155 is configured to perform the actions described herein, and to interact with the user computing device 105 over the network 130. In doing so, the decision delivery module 155 can provide responses to requests that from the perspective of the user computing device 105, appear to come from the web page or resource from which the content request originated. At the same time, the publisher computing device 103 is not aware of the response provided by the traffic routing system 100 through the decision delivery module 155.

Each computing device 101-107 can include one or more processors 110, one or more memory 111, one or more storage medium 112, and/or other components commonly found in general and special purpose computing devices. Although not shown, communication between memory 111, storage medium 112, and processor 110 may be made through one or more communication buses.

The one or more processors 110 can be any of a variety of different types of general-purpose computing processing units (CPUs). Alternatively, or in addition to the CPUs, the processor(s) 110 can be dedicated components such as a graphics processing unit (GPU), an application-specific integrated circuit (ASIC) or other hardware-based processors, such as an ARM processor, field programmable gate array (FPGA), or a System on Chip (SoC).

Each computing device 101-107 may include computer-readable media, such as memory 111 and storage medium 112. Computer-readable media may include both volatile and nonvolatile media that is readable and/or writable by the computing devices 101-107. For instance, computer readable media may include disk based hard drives, solid state hard drives, hybrid hard drives,, memory cards, flash read-only memory (ROM), random access memory (RAM), DVDs, CD-ROMs, EEPROM, SD cards, external hard drives, solid-state drives, including M.2 drives, and other magnetic or optical storage.

Memory 111 may store and provide data and instructions that can be retrieved, executed, and/or manipulated by a processor. The memory 111 can be any computer-readable media, such as ROM or RAM. The instructions and data stored by memory 111 may be those that require immediate access by the processor(s) 110, such as data and instructions that are currently being processed or operated on. In some instances, the instructions and data stored by memory 111 may be those that are commonly executed or processed by the processors. In this regard, delays with retrieving the commonly executed instructions and data may be reduced compared to when the commonly executed instruction and data are stored at a more remote location, such as in storage medium 112.

The instructions may be stored in any format which may be read and executed by the processor and may include any executable code, such as machine code, scripts, applications, etc. Applications may include, for instance, an operating system (OS), mobile applications, computer applications, etc. In some instances, instructions may include portions of executable code, such as application modules which are part of a larger application. The data is not limited to any particular data structure or format. For instance, the data can include individual pieces or data as well as larger data structures such as relational databases, tables, extensible markup language (XML) documents, etc. Additionally, the data may be formatted in many formats such as, but not limited to, binary values, ASCII or Unicode.

Storage medium 112 can be configured to store data and instructions. For instance, storage medium 112 may include applications, such as mobile applications, computer applications, etc., as well as other data and instructions. In some instances, the storage medium 112 may store some or all of the same data and instructions as found in memory 111. The storage medium 112 and/or memory 111 may also include one or more Application Programming Interfaces (APIs) and/or software development kits (SDKs). For instance and as further illustrated in FIG. 1, the storage medium 112 of content service computing device 101 may include one or more APIs 114. As further illustrated in FIG. 1, the storage medium 112 of publisher computing device 101 and user computing device 105 may include SDK 117, which may enable communication with API 114. Although SDK 117 is shown as being within application 111, SDK 117 may be a standalone application.

Although FIG. 1 illustrates the processor 110, memory 111, storage medium 112, and other elements of computing devices 101-105 as being within the same device, the processor 110, memory 111, storage medium 112, and other elements of computing devices 101-105 may be stored in different housings. For example, and referring to the content provider computing device 101, the processor 110, and memory 111 may be located in a different housing from storage medium 112.

Accordingly, references to a processor, computer, computing device, memory, or storage medium will be understood to include references to a collection of processors, computers, computing devices, memories, or storage mediums that may or may not operate in parallel. For example, the content provider computing device 101 may include server computing devices. The content provider computing device 101 may be configured to operate as a load-balanced server farm, distributed system, etc. Similarly, the publisher computing device 103 and the routing computing device 107 can be configured as respective servers. Yet further, although some functions described below are indicated as taking place on a single computing device having a single processor, various aspects of the subject matter described herein can be implemented by a plurality of computing devices, for example, communicating information over the network 130.

The storage device 109 can include any type of storage capable of storing information accessible by the content provider computing device 101, the publisher computing device 103, the user computing device 105, and/or the routing computing device 107. The storage device 109 may include a distributed storage device where data is stored on a plurality of different storage devices which may be physically located at the same or different geographic locations, such as network attached storage. The storage device 109 can be connected to the computing devices 101-107 through the network 130 as shown in FIG. 1, and/or may be directly connected to any of the computing devices 101-107. Although only a single storage device 109 is shown in FIG. 1, any number of storage systems may be included in the example distributed computing system 102. In some instances, access to the storage device 109 may be limited to particular computing devices. In some instances, one or more storage devices may be provided for each computing device.

Each of the computing devices 101-107 can be at different nodes of a network 130 and capable of directly and indirectly communicating with other nodes of the network 130. Although only computing devices 101-107 are depicted in FIG. 1, it should be appreciated that a typical system can include a large number of connected computing devices, with each different computing device being at a node of the network 130. A node is a logical unit of computation, for example represented as a combination of physical computing resources, as well as virtualized computing resources, such as one or more virtual machines. The network 130 and intervening nodes described herein can be interconnected using various protocols and systems, such that the network can be part of the Internet, World Wide Web, specific intranets, wide area networks, or local networks. The network 130 can support a variety of short- and long-range connections along a variety of different bandwidths, such as 2.402 GHz to 2.480 GHz, commonly associated with the Bluetooth® standard, 2.4 GHz and 5 GHz, commonly associated with the Wi-Fi® communication protocol, or with a variety of communication standards, such as the LTE® standard for wireless broadband communication. The network 130, in addition or alternatively, can also support wired connections between the devices 101-105, 120 including various types of Ethernet connection.

Although certain advantages may be obtained when information is transmitted or received as noted above, other aspects of the subject matter described herein are not limited to any particular manner of transmission of information.

Each of the computing devices 103, 105, and 107 may be configured similarly to the server computing devices 101, with one or more processors, memory, and storage mediums as described above. The user computing device 105 can be a personal computing device intended for use by a user, and have all of the components normally used in connection with a personal computing device such as a central processing unit (CPU), memory storing data and instructions, a display such as display 115, such as a monitor having a screen, a touch-screen, a projector, a television, or other device that is operable to display information, and input device 116, such as a mouse, keyboard, touch-screen, or microphone. Although not shown, the devices 101, 103, and 107 may also include displays and user input devices. The computing devices 101-107 may also include a network interface device, and any other components used for connecting these elements to one another.

Example Methods

In addition to the operations described above and illustrated in the figures, various operations will now be described. The following operations do not have to be performed in the precise order described below. Rather, various steps can be handled in a different order or simultaneously, and steps may also be added or omitted.

Figure 2:
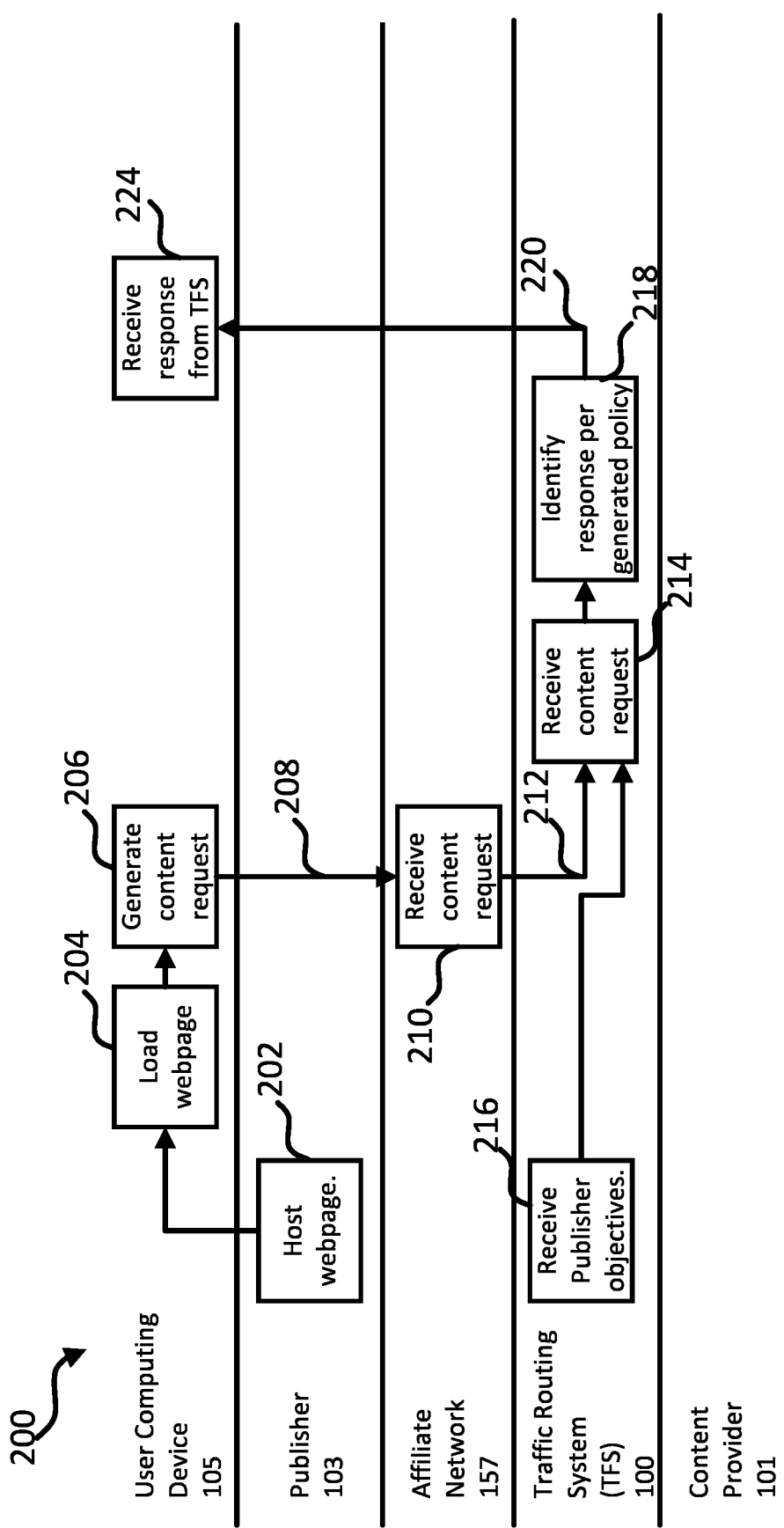
FIG. 2 is a flow diagram of an example process for routing content in response to a content request among the devices shown in FIG. 1.

FIG. 2 is a flow diagram of an example process 200 for routing content in response to a content request among the devices shown in FIG. 1. The publisher hosts a web page or other resource accessible to a user computing device, as shown in block 202. The user computing device loads the webpage, according to block 204, and generates a content request, according to block 206. As described herein, the content request can be generated from an interactable element of the web page, such as a link.

The content request can be sent to the affiliate network, as shown by line 208. After receiving the content request, as shown in block 210, the affiliate network forwards the content request to the traffic routing system, and the traffic routing system receives the content request, as shown by line 212 and block 214, respectively. As part of forwarding the content request, a computing device of the affiliate network is configured to receive the incoming content request and configure the request as a request to the traffic routing system. The request can be formed in accordance with an API exposing the traffic routing system, and include fields for different data points characterizing the request, as described herein.

The traffic routing system receives publisher objectives, according to block 216. As described herein, the traffic routing system can generate one or more policies for responding to a content request, based at least in part on the objectives of a given publisher. The traffic routing system can maintain separate objectives for each publisher of the affiliate network, and generate policies accordingly. As described herein and in reference to FIG. 6, the traffic routing system can periodically update generated policies in response to additionally received data points from different content requests to the system.

The traffic routing system identifies a response per generated policy, as shown in block 218. The traffic routing system can apply a generated policy to determine the set of actions to take in response to the content request. As described herein, the traffic routing system can select one of multiple policies to execute, for example based on different probabilities assigned to multiple policies responsive to the content request. The decision delivery module of the traffic routing system can be configured to receive the content request, the identified policy, and to perform actions corresponding to the content request, including serving content to the user computing device. The traffic routing system sends content in response to the content request, according to line 220. As described herein, the response can be, for example, in the form of a link or redirect, depending on the content request and the applied policy. The user computing device can receive and display the content in response to the request, according to block 224.

Figure 3:
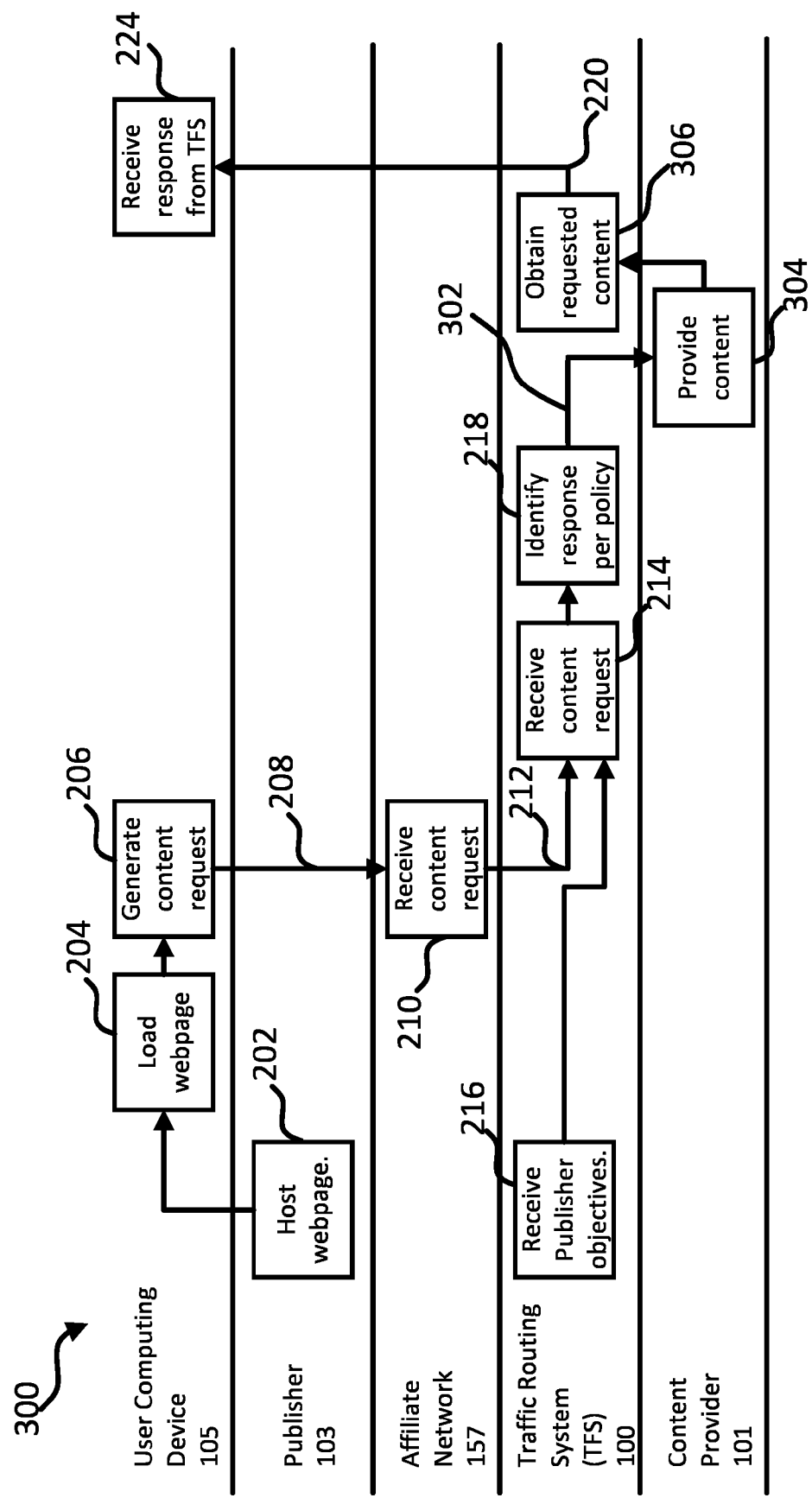
FIG. 3 is a flow diagram of an example process of providing content from a content provider in response to a content request.

FIG. 3 is a flow diagram of an example process 300 of providing content from a content provider in response to a content request. The process 300 can include elements of the process 200, including generating a content request, receiving the request by the traffic routing system, and identifying a response per a policy, according to elements 202-218. Also in the process 300, the traffic routing system can send a request to a content provider to retrieve content responsive to the content request and according to the policy, as shown by line 302. In some examples, the content responsive to a request can be content provided by a content provider, as described herein. The traffic routing system can be configured to send a request to a computing device storing content from the content provider, for example through an API request using an API exposing the computing device storing the content.

The content provider through a computing device can provide the content to the traffic routing system in response to the request, according to line 302 and block 304. Then, the traffic routing system can obtain the requested content and send the content to the user computing device, according to block 306 and line 220.

Figure 4:
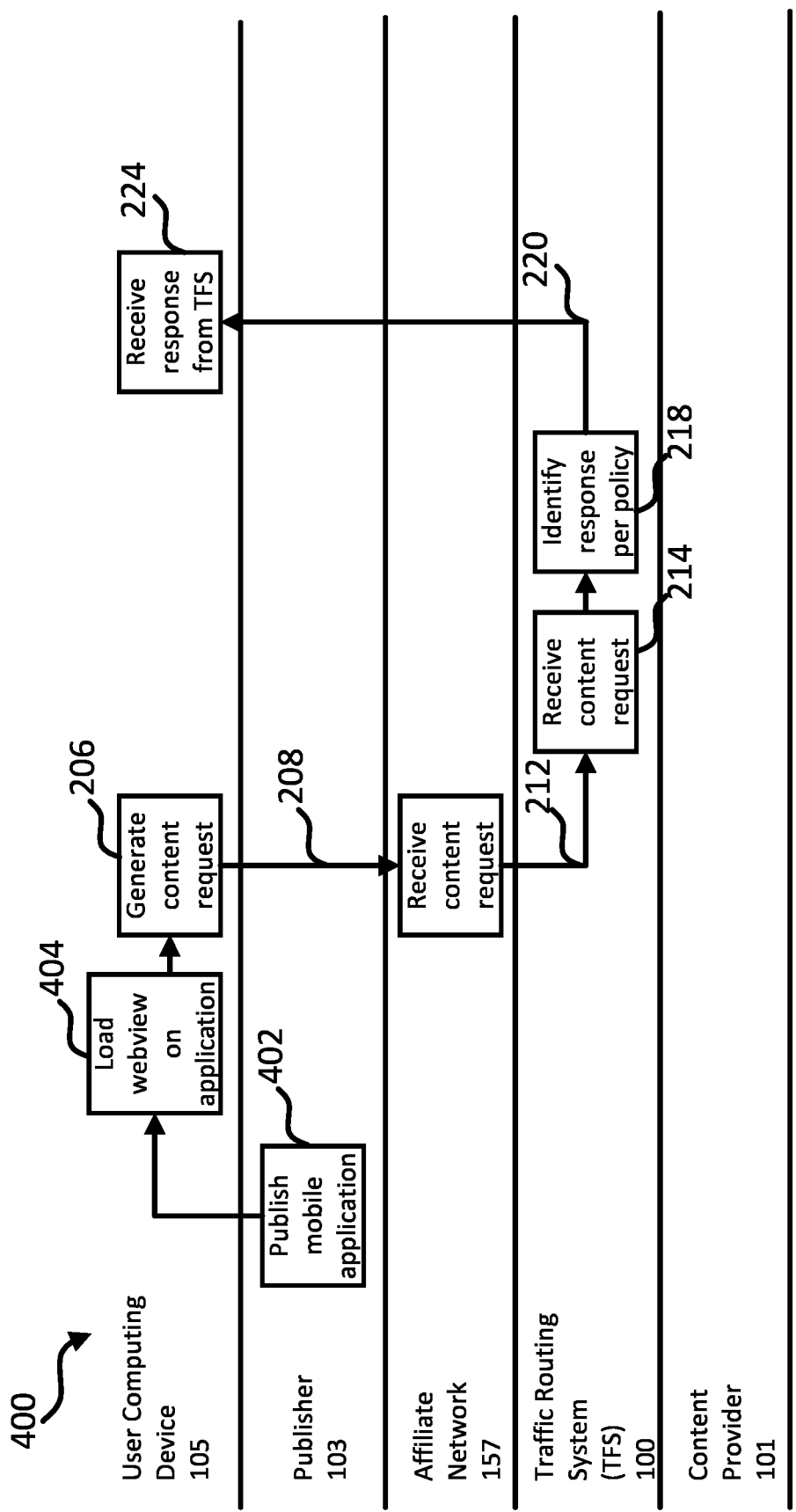
FIG. 4 is a flow diagram of an example process for routing content in response to a content request from a mobile application.

FIG. 4 is a flow diagram of an example process 400 for routing content in response to a content request from a mobile application. A mobile application is published, according to block 402, and the user computing device loads a webview on the application, according to block 404. The user computing device can generate a content request, according to block 206 and in response to user interaction with the loaded webview, for example in response to user interaction with a link on the webview. The process 400 can include receiving the content request, identifying a response per a policy, and the user computing device receiving a response from the traffic routing system, in accordance with elements 208-224 and as described herein.

Figure 5:
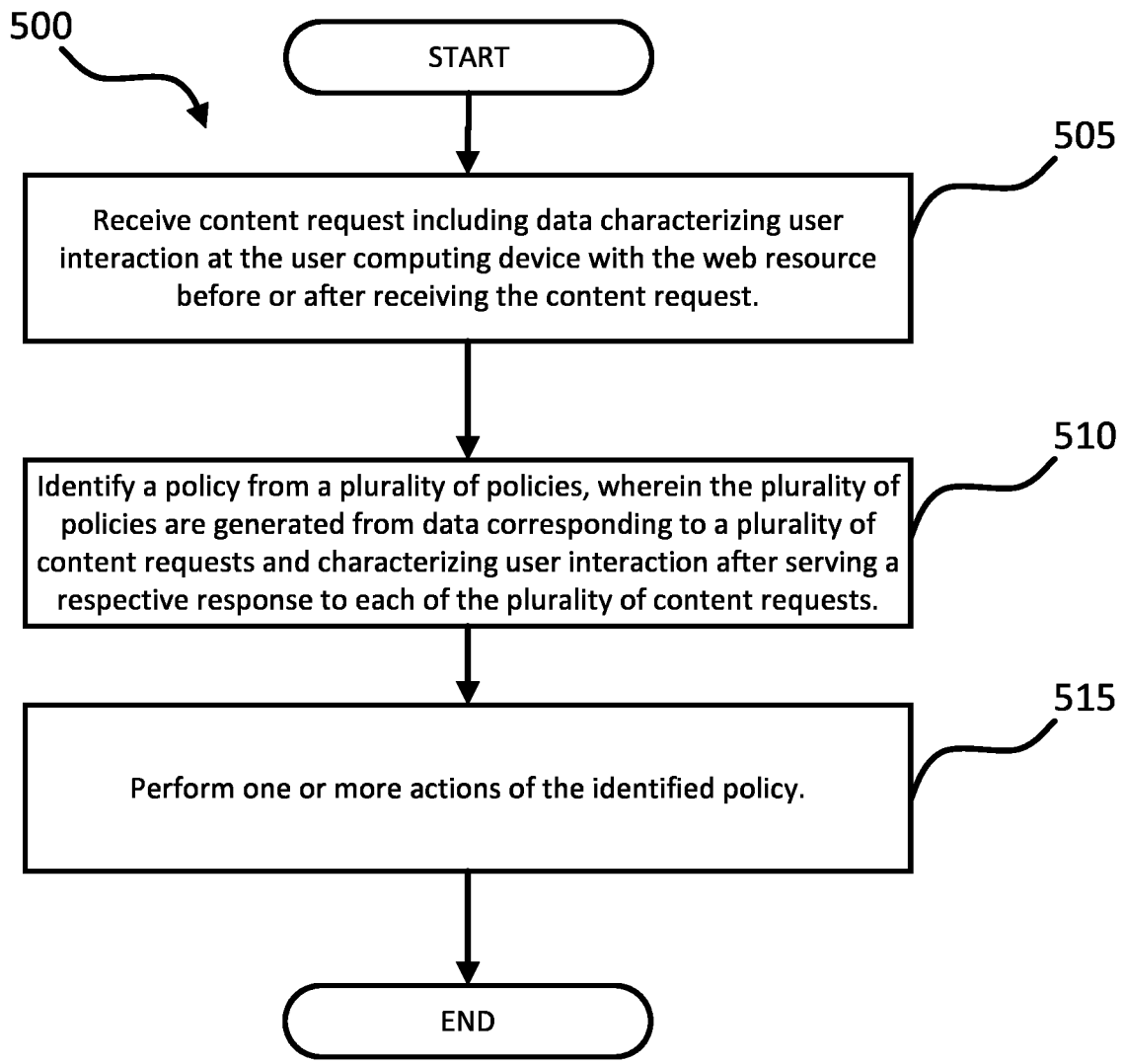
FIG. 5 is a flow diagram of an example process for generating and executing a policy for routing content in response to a content request.

FIG. 5 is a flow diagram of an example process 500 for generating and executing a policy for routing content in response to a content request. A system including one or more processors and one or more memory devices, appropriately configured in accordance with the disclosure, can perform the process 500. For example, a traffic routing system, such as the traffic routing system 100, can perform the process 500.

The traffic routing system receives a content request characterizing user interaction at the user computing device with a web resource before or after receiving the content request, according to block 505. As described herein, the content request can include multiple data points characterizing, for example, user environment, user experience, and user journey. The web resource can be hosted by a publisher computing device and accessed by the user computing device, for example through a browser or as a web view for a dedicated mobile application associated with the publisher. As another example, the content request can be received as a data object including a plurality of data points, such as points corresponding to a user of the user computing device, the user computing device, a publisher publishing the web resource accessed by the user computing device, interactions between the user computing device and a publisher computing device hosting the web resource, and content provided in response to the request.

The traffic routing system identifies a policy from a plurality of policies, wherein the plurality of policies are generating from data corresponding to a plurality of content requests and data characterizing user interaction after serving a respective response to each of the plurality of content requests, according to block 510. As described herein, the policies are mapped from data points of different content requests received by the traffic routing system, according to mappings that result in the highest metrics characterizing user interaction according to one or more objectives particular to the publisher of the web resource.

The traffic routing system performs one or more actions of the identified policy. As described herein, the policy can be a ranked list of actions that can be performed by the decision delivery module of the traffic routing system. The decision delivery module can be configured to perform actions with a higher ranking before performing actions of a lower ranking.

Figure 6:
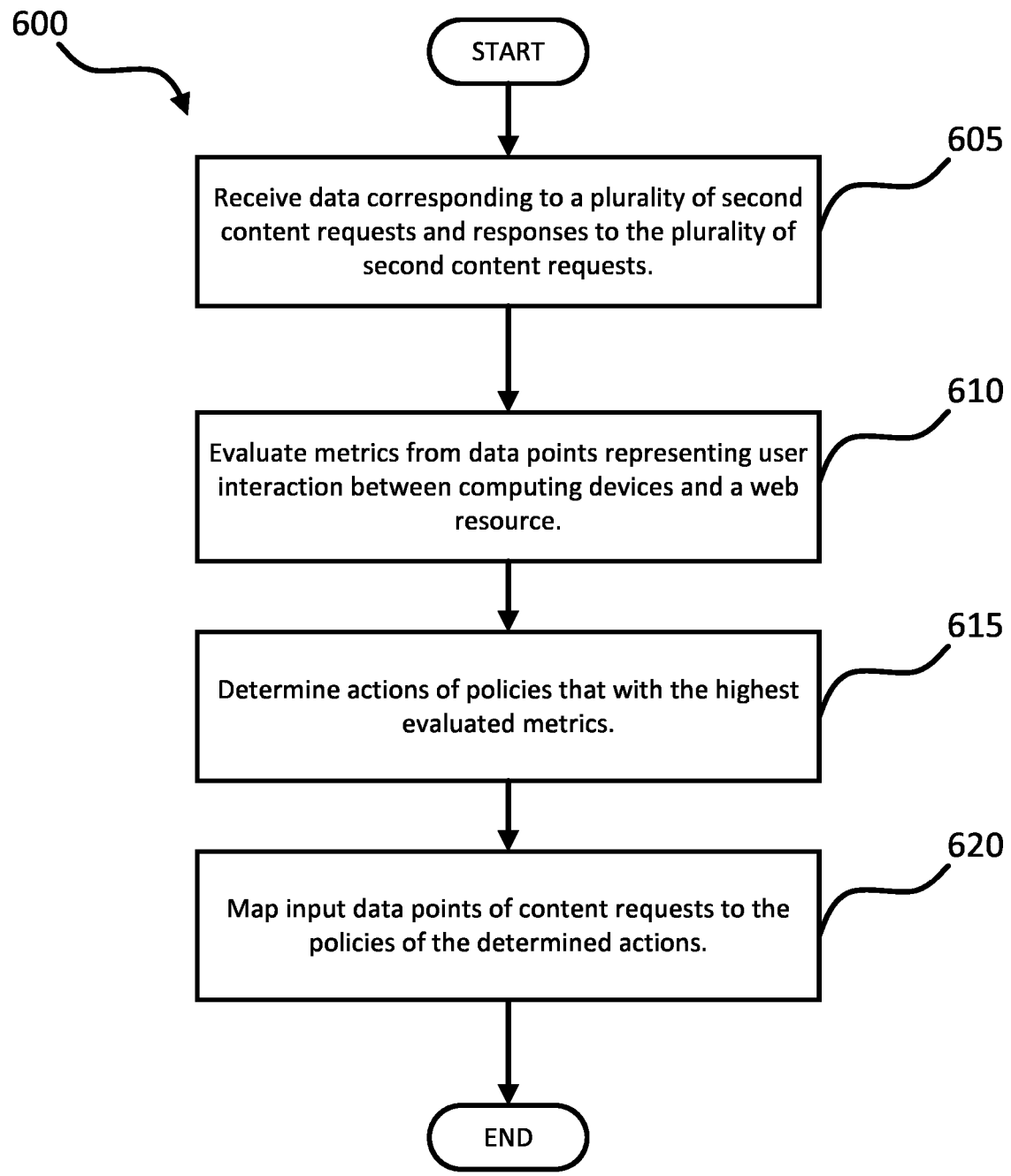
FIG. 6 is a flow diagram of an example process for training a feedback engine, according to aspects of the disclosure.

FIG. 6 is a flow diagram of an example process 600 for training a feedback engine of a traffic routing system, according to aspects of the disclosure.

The system receives data corresponding to a plurality of content requests and a plurality of responses to the content requests, according to block 605. The system can receive this data for some or all of the user computing devices interacting with the system as part of responding to content requests. The user computing devices can access web pages or resources hosted by different publisher computing devices, and the responses can correspond to actions performed by the system and specified in policies mapped to the content requests, as described herein.

The system evaluates metrics from data points of the content requests representing user interaction between computing devices and a web page or resource, according to block 610. As described herein, each publisher can correspond to one or more objectives, and the system can be configured to evaluate metrics corresponding to the objectives from data points of content requests.

The system determines actions of policies with the highest metrics according to one or more objectives, according to block 615. The system maps input data points of content requests to the policies of the determined actions, according to block 620. As described herein, the optimization module can implement any of a variety of techniques for determining the mapping between data points of content requests and one or more policies, and use metrics corresponding to objectives for a particular publisher whose web resource was accessed by the user computing device in generating the request.

The subject matter described in this specification can be implemented so as to realize one or more of the following advantages or technical effects. Web traffic can be adaptively and accurately routed by leveraging characteristics of individual devices communicating over the open web. A system implemented in accordance with aspects of this disclosure can predict a traffic route to content deemed to be the best response to a particular user according to one or more predetermined objectives. Traffic can be accordingly routed on a per-user basis, as opposed to routing traffic using global rules. Characteristics such as the type of device, the type of application, and available user behavior characteristics can be used to predict web traffic routing rules particular to users of an identified type. The system can reference the individualized web traffic routing rules to respond to a content request within an acceptable latency period.

An existing traffic routing system can be augmented according to aspects of this disclosure to provide for more accurate distribution of content to content requesting computing devices, without requiring modification to a user frontend for generating and sending those content requests. Different content providers can interface with the feedback engine to provide for granular control over how their content is distributed in a way not possible with existing traffic routing systems that rely on global rules or policies for determining how content is served to a content requesting device.

To that end, the system can periodically update web traffic routing policies for different learned types of users, such as by using any of a variety of machine learning techniques. The updated policies can be saved and accessed in real-time, and the system can further keep track of different sets of web traffic routing rules according to specifications by different content providers. In this way, content from a content provider network can be quickly and accurately routed to multiple different users, without disrupting the user experience, at least because the interface by which users request content does not need to be modified.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices.

The term "engine" can refer to a software-based system or subsystem for performing one or more functions. The engine can include one or more software modules, as well as other components, which can be implemented on or more computing devices in one or more locations.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for updating a feedback model comprising:
receiving, by one or more computing devices, data corresponding to a set of content requests, the data corresponding to the set of content request including, for each content request in the set of content requests, data characterizing interactions with a respective web resource before and after the respective content request was made;
receiving, by the one or more computing devices, responses to each content request of the set of content requests, wherein each response includes one or more actions performed to satisfy the respective content request, wherein the one or more actions were identified by the feedback model in accordance with a respective policy based on at least one objective; and
updating, by the one or more computing devices, the feedback model, wherein updating the feedback model comprises:
evaluating one or more metrics to determine actions from the one or more actions of each response that satisfy or fail to satisfy the at least one objective, wherein each of the one or more actions were selected in accordance with the respective policy based on the at least one objective; and
adjusting a mapping between inputs of the feedback model to each of the respective policies based on data corresponding to the determined actions that satisfy or fail to satisfy the at least one objective.

2. The method of claim 1, wherein each policy is generated using data from a plurality of received content requests and data characterizing user interactions with the respective web resource after serving a respective response to each of the plurality of content requests.

3. The method of claim 2, wherein the plurality of received content requests includes the set of content requests.

4. The method of claim 1, wherein the data corresponding to the set of content requests includes a plurality of data points, each data point corresponding to one or more of:
a user of the user computing device,
the user computing device,
a publisher publishing the respective web resource,
interactions between the user computing device and a publisher computing device hosting the respective web resource, and
content provided in response to the respective content request.

5. The method of claim 1, wherein the at least one objective comprises one or more of increasing user engagement, conversion rate, and repeat requests for the requested content.

6. The method of claim 1, wherein the evaluated metrics comprise metrics quantifying, from the data corresponding to a set of content requests one or more of user engagement and conversion rate for the requested content.

7. The method of claim 1, wherein the one or more actions includes at least one of:
prompting a user computing device to install a mobile application;
redirecting the user computing device to a web resource hosting content in response to the content request; and
sending a deep link to the web resource hosting content in response to the content request.

8. The method of claim 1, the updating of the feedback model, wherein updating the feedback model occurs periodically.

9. The method of claim 1, wherein the at least one objective is provided by a single publisher or multiple publishers.

10. The method of claim 1, wherein the at least one objective is provided by a single content provider or multiple content providers.

11. The method of claim 1, wherein the data corresponding to the determined actions that satisfy or fail to satisfy the at least one objective includes data corresponding to the respective content requests of the set of content requests which resulted in the selection of the determined actions.

12. A system for updating a feedback model comprising:
one or more processors; and
one or more memory devices storing instructions that when executed by the one or more processors, cause the one or more processors to perform operations comprising:
receiving data corresponding to a set of content requests, the data corresponding to the set of content request including, for each content request in the set of content requests, data characterizing interactions with a respective web resource before and after the respective content request was made;
receiving responses to each content request of the set of content requests, wherein each response includes one or more actions performed to satisfy the respective content request, wherein the one or more actions were identified by the feedback model in accordance with a respective policy based on at least one objective; and
updating the feedback model, wherein updating the feedback model comprises:
evaluating one or more metrics to determine actions from the one or more actions of each response that satisfy or fail to satisfy the at least one objective, wherein each of the one or more actions were selected in accordance with the respective policy based on the at least one objective; and
adjusting a mapping between inputs of the feedback model to each of the respective policies based on data corresponding to the determined actions that satisfy or fail to satisfy the at least one objective.

13. The system of claim 12, wherein each policy is generated using data from a plurality of received content requests and data characterizing user interactions with the respective web resource after serving a respective response to each of the plurality of content requests.

14. The system of claim 13, wherein the plurality of received content requests includes the set of content requests.

15. The system of claim 12, wherein the data corresponding to the set of content requests includes a plurality of data points, each data point corresponding to one or more of:
a user of the user computing device,
the user computing device,
a publisher publishing the respective web resource,
interactions between the user computing device and a publisher computing device hosting the respective web resource, and
content provided in response to the respective content request.

16. The system of claim 12, wherein the at least one objective comprises one or more of increasing user engagement, conversion rate, and repeat requests for the requested content.

17. The system of claim 12, wherein the evaluated metrics comprise metrics quantifying, from the data corresponding to a set of content requests one or more of user engagement and conversion rate for the requested content.

18. The system of claim 12, wherein the one or more actions includes at least one of:
prompting a user computing device to install a mobile application;
redirecting the user computing device to a web resource hosting content in response to the content request; and
sending a deep link to the web resource hosting content in response to the content request.

19. The system of claim 12, the updating of the feedback model, wherein updating the feedback model occurs periodically.

20. The system of claim 12, wherein the at least one objective is provided by a single publisher or multiple publishers.

21. The system of claim 12, wherein the at least one objective is provided by a single content provider or multiple content providers.

22. The system of claim 12, wherein the data corresponding to the determined actions that satisfy or fail to satisfy the at least one objective includes data corresponding to the respective content requests of the set of content requests which resulted in the selection of the determined actions.

* * * * *